United States Patent
Kamiya et al.

(10) Patent No.: US 7,628,102 B2
(45) Date of Patent: Dec. 8, 2009

(54) CIRCULAR SAWS

(75) Inventors: Takahiro Kamiya, Anjo (JP);
Tomonobu Nashimoto, Anjo (JP)

(73) Assignee: Makita Corporation, Anjo-shi (JP)

( * ) Notice: Subject to any disclaimer, the term of this patent is extended or adjusted under 35 U.S.C. 154(b) by 368 days.

(21) Appl. No.: 11/009,936

(22) Filed: Dec. 8, 2004

(65) Prior Publication Data

US 2005/0120845 A1    Jun. 9, 2005

(30) Foreign Application Priority Data

Dec. 8, 2003    (JP)    ............................. 2003-409070

(51) Int. Cl.
     *B23D 45/16*    (2006.01)
(52) U.S. Cl. .................. 83/78; 83/100; 125/13.01; 30/388; 30/389; 30/390; 30/391
(58) Field of Classification Search ........... 30/388–391, 30/124, 133; 83/100, 78; 125/13.01
See application file for complete search history.

(56) References Cited

U.S. PATENT DOCUMENTS

| 4,675,999 | A | * | 6/1987 | Ito et al. ................. 30/124 |
| 5,074,044 | A | * | 12/1991 | Duncan et al. ............ 30/124 |
| 5,146,682 | A | * | 9/1992 | Blochle et al. ............ 30/124 |
| 5,701,676 | A | * | 12/1997 | Itoh ....................... 30/388 |
| 6,009,782 | A | | 1/2000 | Tajima et al. |
| 2004/0093743 | A1 | * | 5/2004 | Fukuoka ................. 30/391 |

FOREIGN PATENT DOCUMENTS

| JP | 01148502 | | 6/1989 |
| JP | 3-117528 | | 12/1991 |
| JP | 06190628 | | 12/1992 |
| JP | 05-041702 | | 2/1993 |
| JP | 05-041702 U | | 6/1993 |
| JP | 406190628 | * | 7/1994 |

OTHER PUBLICATIONS

Japanese Office Action for Application No. 2003-409070, dated Sep. 16, 2009.

* cited by examiner

*Primary Examiner*—Joseph J Hail, III
*Assistant Examiner*—Robert Scruggs
(74) *Attorney, Agent, or Firm*—Lahive & Cockfield, LLP; Anthony A. Laurentano

(57) ABSTRACT

It is an object of the invention to provide a dust collecting circular saw in which cooling air to cool the motor can be further effectively utilized. According to the present invention, a representative dust collecting circular saw may comprise a blade, a motor, a cooling fan, a dust case, a dust case cover and an air space between the dust case cover and the dust case. The cooling air to cool the motor is designed to be introduced into the air space. Therefore, according to the invention, heat of the dust case caused by hot chips collected within the dust case can be prevented from being transferred from the dust case to the dust case cover by the air space into which the cooling air is introduced. Thus, the user of the circular saw can securely be escaped from contacting any circular saw members heated by the hot chips within the dust case.

9 Claims, 5 Drawing Sheets

CIRCULAR SAWS

BACKGROUND OF THE INVENTION

1. Field of the Invention

The present invention relates to a circular saw and more particularly, to a dust collecting circular saw having a dust case in which chips generated during operation of cutting a workpiece can be collected.

2. Description of the Related Art

Japanese laid-open utility model publication No. 5-41702 discloses a dust collecting circular saw for cutting metal workpiece such as a steel or iron plate. The known circular saw includes a dust case to collect chips generated during the metal workpiece cutting operation. Within the known circular saw, an outlet for cooling air is formed in the side surface of a blade case that covers a blade. The cooling air to cool the motor is led from a motor housing into the blade case via an outlet and blown out onto the upper inner circumferential surface of the blade case. As a result, the blade case heated by the metal cutting chips can be cooled. As well, the cooling air is introduced into the dust case to cool the dust case. However, due to momentum of the cooling air introduced into the dust case, collected chips within the dust case may possibly escape out of the dust case. In this connection, further improvement of rational structure in the dust collecting circular saw is desired.

SUMMARY OF THE INVENTION

It is, accordingly, an object of the invention to provide a dust collecting circular saw in which cooling air to cool the motor can be further effectively utilized.

According to the present invention, a representative circular saw may include a blade, a motor, a cooling fan, a dust case, a dust case cover and an air space between the dust case cover and the dust case. The cooling air to cool the motor is designed to be introduced into the air space. Therefore, according to the invention, heat of the dust case caused by hot chips collected within the dust case can be prevented from being transferred from the dust case to the dust case cover by the air space into which the cooling air is introduced. Thus, the user of the circular saw can securely be escaped from contacting any circular saw members heated by the hot chips within the dust case.

Other objects, features and advantages of the present invention will be readily understood after reading the following detailed description together with the accompanying drawings and the claims.

DEATAILED DESCRIPTION OF THE INVENTION

Figure 1:
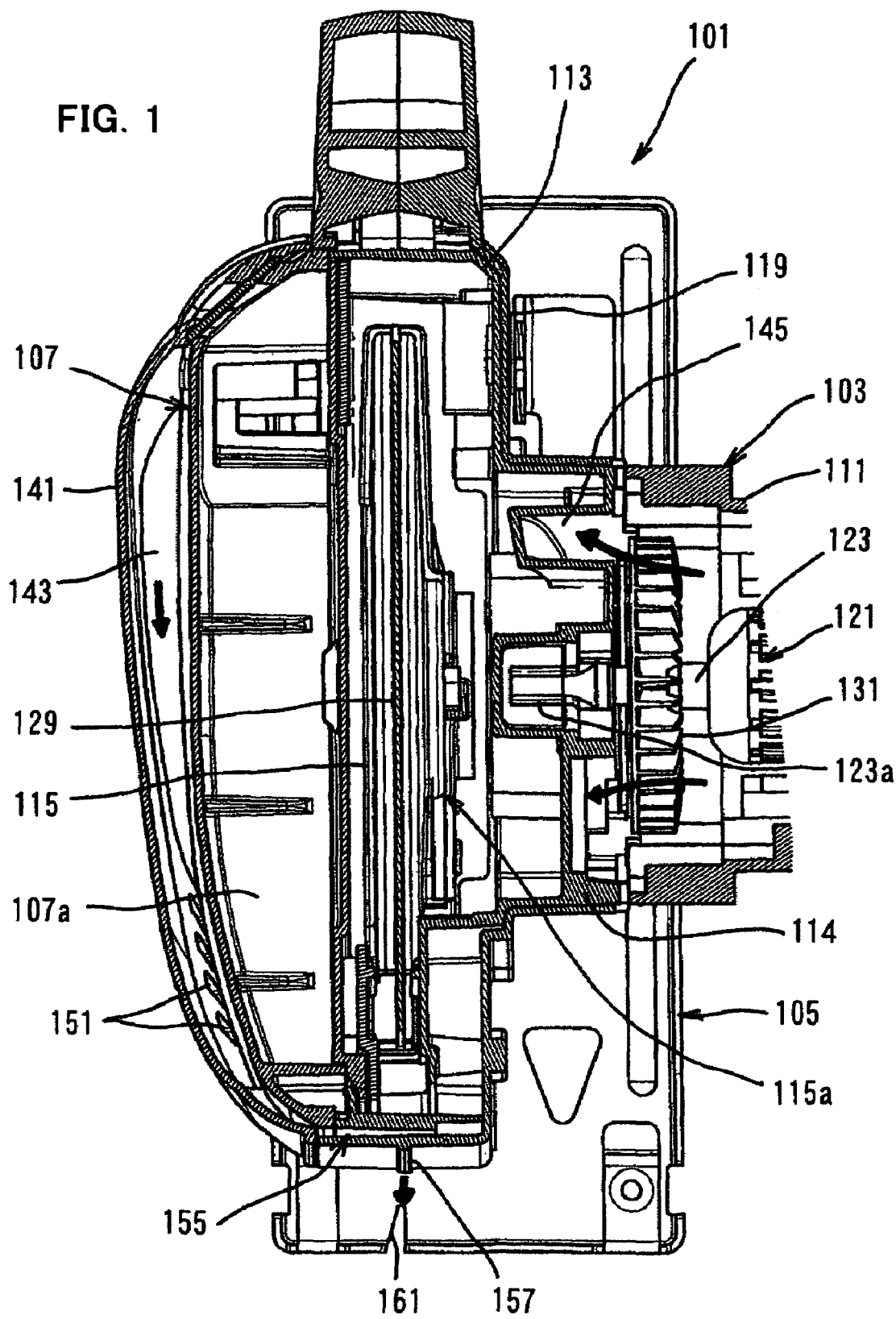
FIG. 1 is a sectional plan view showing a dust collecting circular saw according to a representative embodiment in its entirety except part of a motor housing and a driving motor.

The representative dust collecting typed circular saw according to the invention may include a blade that cuts a workpiece, a motor that drives the blade, a cooling fan that generates a cooling air to cool the motor, a dust case that collects chips generated during the cutting operation by the blade, a dust case cover that covers at least part of the outside surface of the dust case and air space formed between the dust case cover and the dust case, wherein the cooling air is introduced into the air space. The representative circular saw is preferably applied to cut metal workpiece such as a steel material and an iron plate, while it can also be applied to cut wood or stone. Typically, when cutting metal workpiece, hot metal chips may be generated during the cutting operation and such hot chips may heat the dust case when chips are collected into the dust case. To cope with such heating, the representative circular saw introduces the cooling air to cool the motor into the air space between the heated dust case and the dust case cover. As a result, heat transfer from the dust case to the dust case cover can be prevented and therefore, the user can be securely escaped from directly contacting any heated members of the circular saw. Further, according to the invention, while the cooling air can actively cool the outside surface of the dust case, chips within the dust case do not escape to the outside because the cooling air is not introduced into the dust case.

Each of the additional features and method steps disclosed above and below may be utilized separately or in conjunction with other features and method steps to provide and manufacture improved circular saws and method for using such circular saws and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the present invention is explained with reference to FIGS. 1 to 5. In FIGS., flow of cooling air and flow of chips are shown by thick arrows and thin arrows, respectively. The dust collecting circular saw 101 according to the representative embodiment is designed for cutting metal workpiece such as a steel material and an iron plate. The circular saw 101 includes a circular saw body 103, a base 105 and a dust case 107. The base 105 is connected to the body 103 and placed in use on a workpiece (not shown). The dust case 107 is removably attached to the body 103 and chips generated during the cutting operation are collected in the dust case 107.

As shown in FIG. 1, a motor housing 111 and a blade case 113 is connected together to define the circular saw body 103. The motor housing 111 houses a driving motor 121 and a cooling fan 131. The cooling fan 131 is mounted on a driving shaft 123 of the driving motor 121 and rotated together with the driving shaft 123 when the driving motor 121 is driven.

Figure 2:
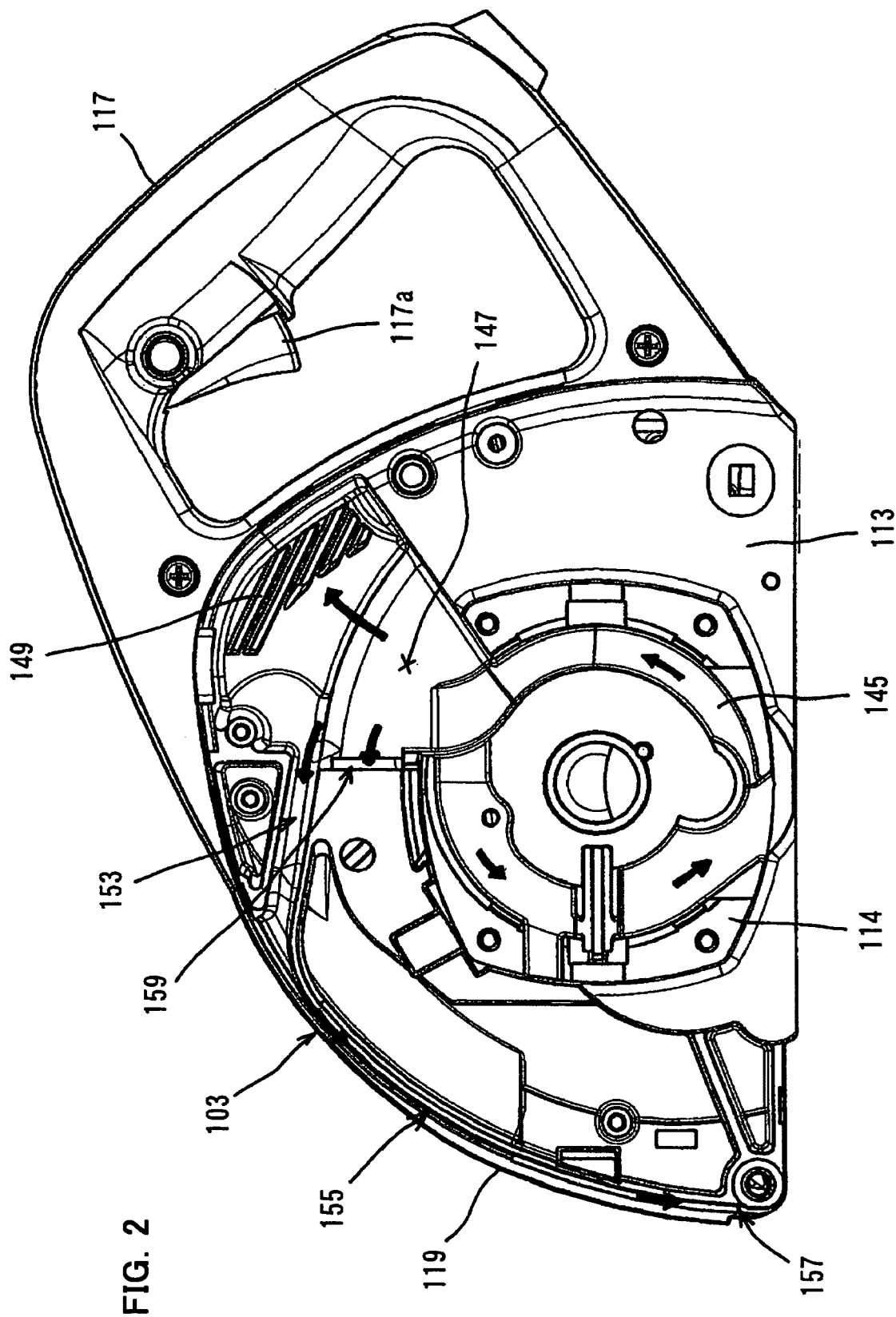
FIG. 2 is a right side view of a blade case, in which the motor housing and a base are deleted.
Figure 3:
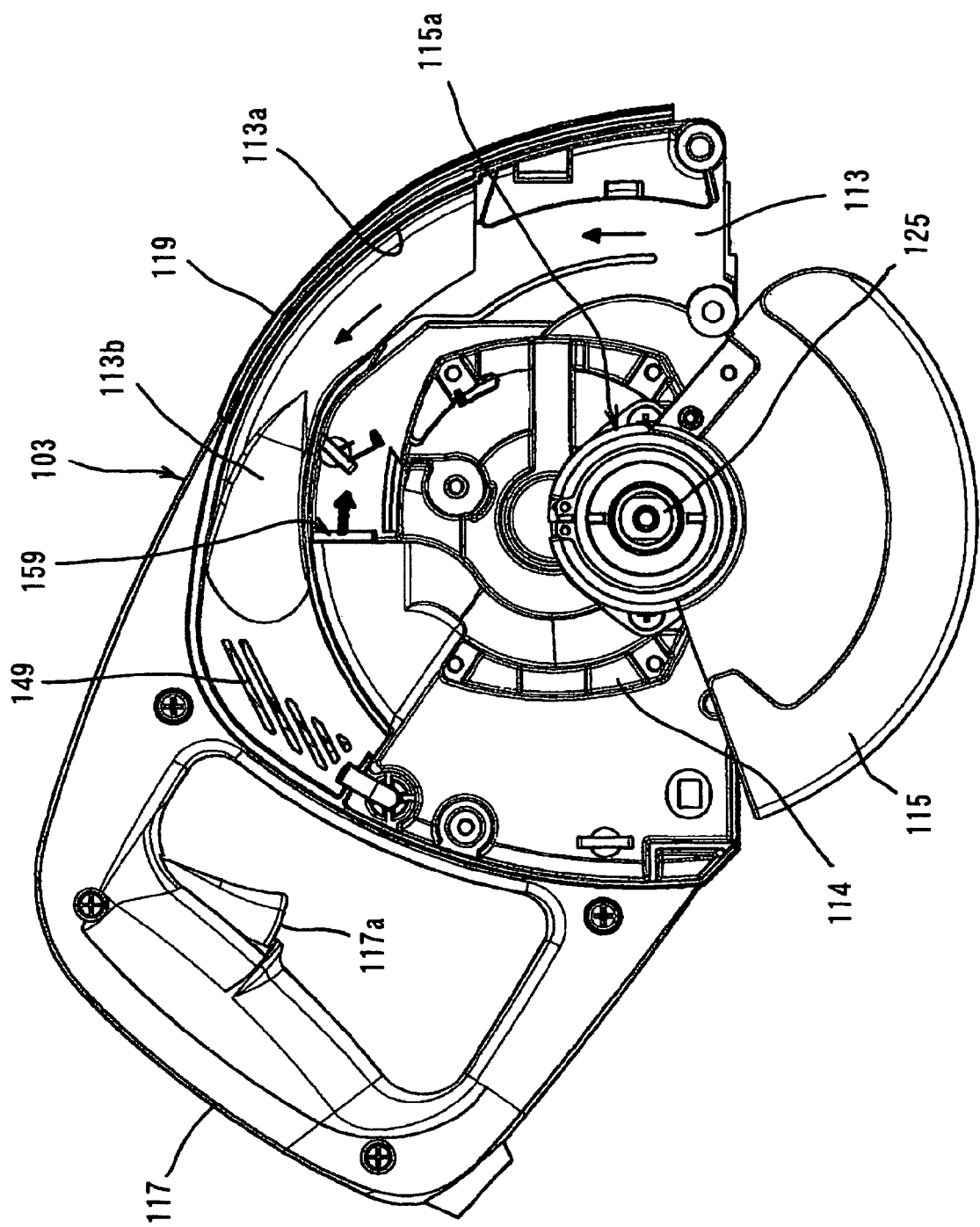
FIG. 3 is a left side view of the blade case, in which a dust case and the base are deleted.

The blade case 113 houses a blade 129. A safety cover 115 is retractably attached to the lower region of the blade case 113. As shown in FIGS. 2 and 3, the blade case 113 has a handgrip 117 and a circular gear housing 114. The handgrip 117 is formed on the rearward outer circumferential portion of the blade case 113. The gear housing 114 is integrally formed on the side of the blade case 113 and bulges toward the motor housing 111. The handgrip 117 has a trigger 117a operated to start and stop the driving motor 117. As shown in FIG. 1, the side peripheral edge portion or the end surface of the gear housing 114 which bulges toward the motor housing 111 butts the open end surface of the motor housing 111 and is connected to the motor housing 111 by bolts (not shown).

A driven gear 133 (not shown) and a spindle 125 (see FIG. 3) are disposed within the gear housing 114 in a position corresponding to the position of the end of the driving shaft 123 that extends toward the gear housing 114. The driven gear is mounted on one end of the spindle 125 and a blade 129 is mounted on the other end of the spindle 125. The spindle 125, the blade 129 and the driven gear can rotate together in one piece. A driving gear 123a is formed on the end of the driving shaft 123 and engages the driven gear. Thus, the rotation of the driving motor 121 is transmitted to the blade 129 via the spindle 125 while being decelerated between the driving gear 123a and the driven gear. Thus, the blade 129 is rotated and cuts a workpiece.

As shown in FIG. 3, the safety cover 115 is mounted on the spindle 125 and can rotate with respect to the spindle 125 via a rotation sliding portion 115a. The safety cover 115 is normally protruded from the underside of the base 105 by a biasing device (not shown) including a spring and covers the lower edge portion of the blade 129 for cutting a metal workpiece. When the base 105 is placed on the workpiece to be cut, the safety cover 115 is pushed and retracted by the workpiece, so that the safety cover 115 exposes the lower edge portion of the blade 129 and is housed within the blade case 113.

Chips are generated by cutting the metal workpiece with the blade 129 and fly out in the tangential direction of the blade 129. Specifically, as shown by the thin arrows in FIG. 3, the chips fly upward into the blade case 113 and move toward a chip outlet 113b along an inner circumferential surface 113a of the peripheral wall of the blade case 113 or its vicinity. The chip outlet 113b is formed in the upper portion of the side wall surface of the blade case 113 on the side of the dust case 107. The metal workpiece generates relatively hot metal chips when being cut by the blade 129. Thus, the metal chips fly out into the blade case 113 generally heat the blade case 113. Therefore, the blade case 113 is made of metal such as aluminum alloy in consideration of heat resistance, while the outer surface of the blade case 113 becomes hot due to such hot metal chips.

Figure 4:
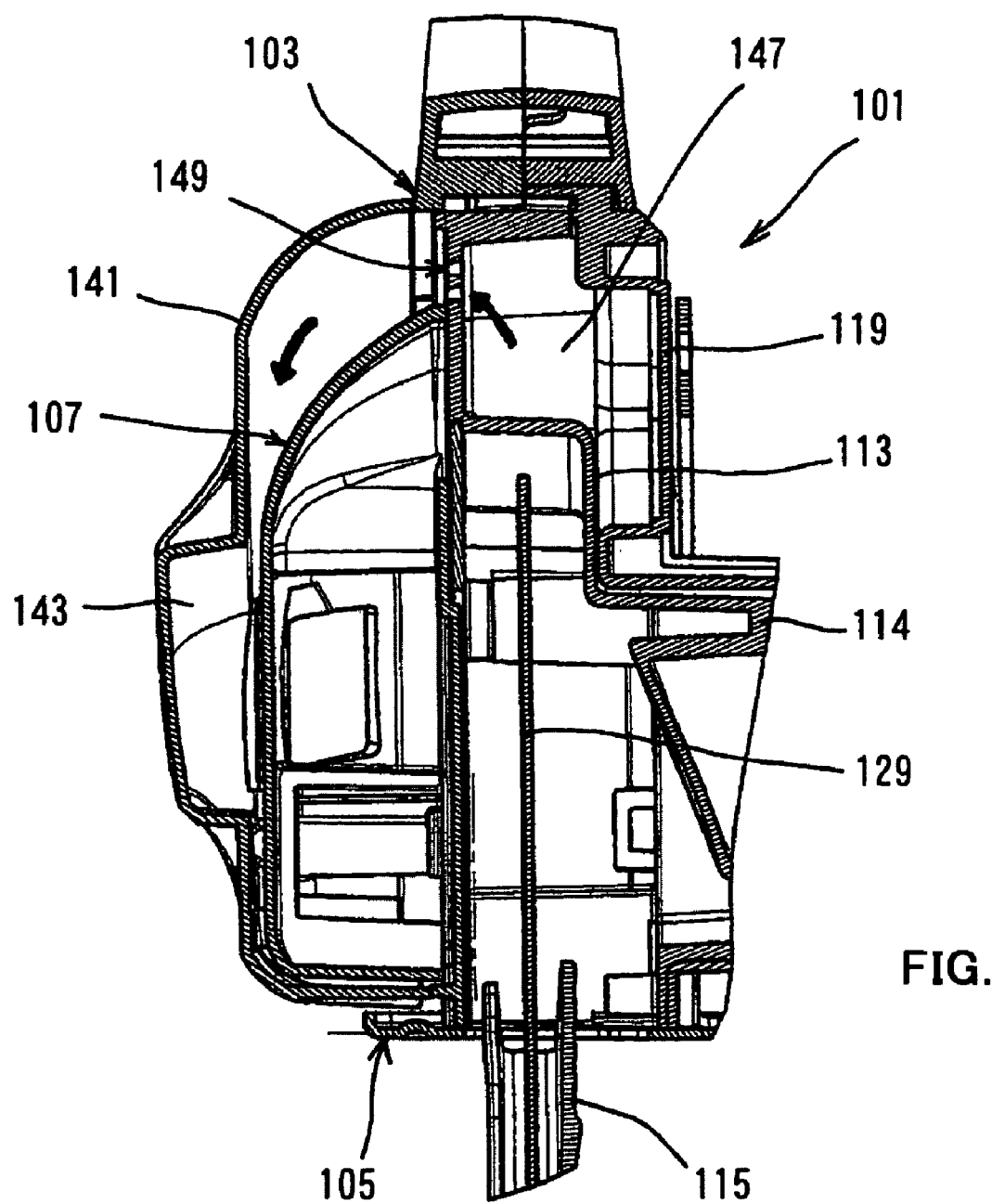
FIG. 4 is a sectional front view showing the dust collecting circular saw as taken along a line slightly displaced rearward of the axis of rotation of the driving motor.
Figure 5:
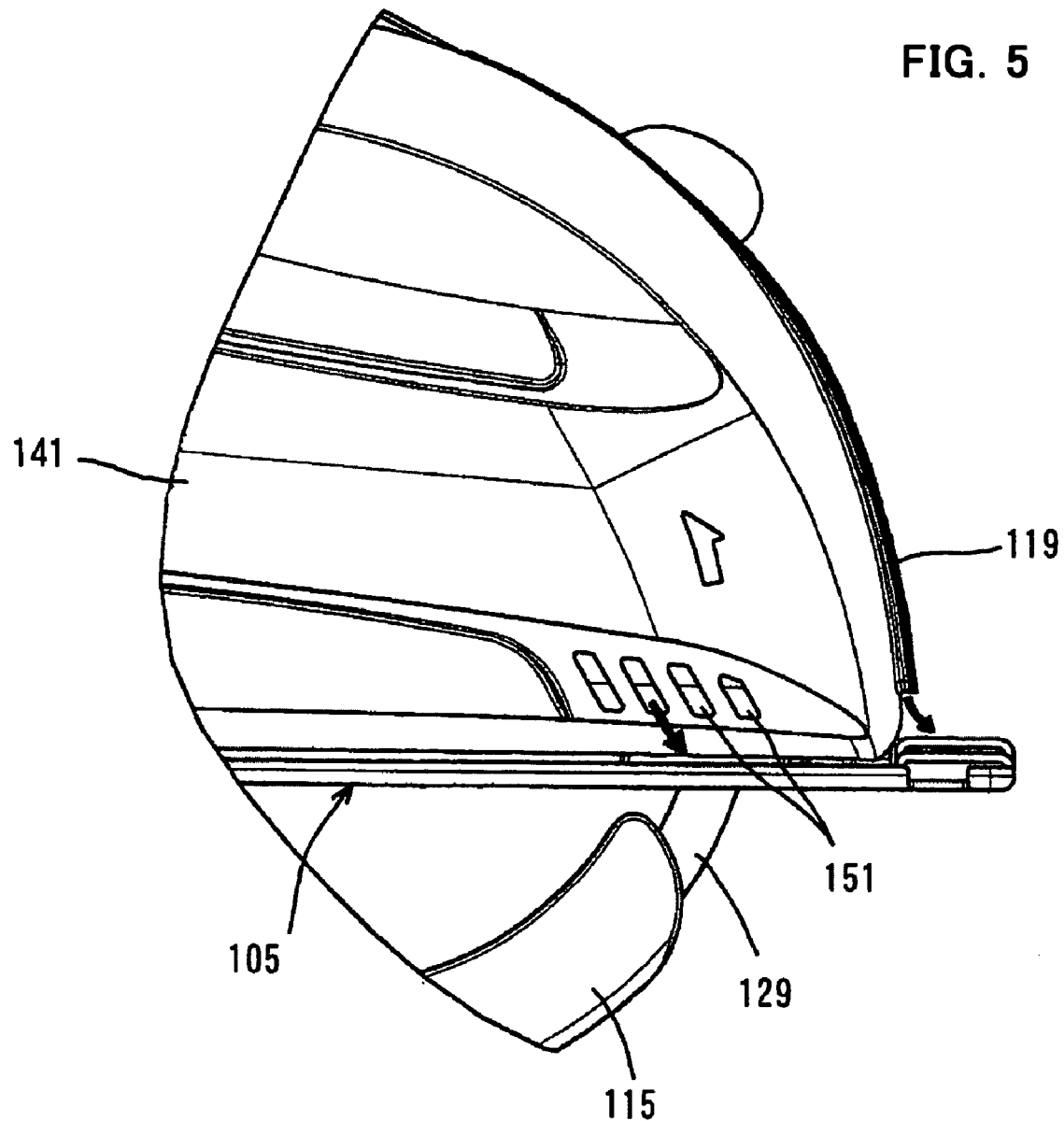
FIG. 5 is a side view of a forward end part of the circular saw as viewed from the left side of FIG. 1.

In view of this fact, in order to prevent the user from directly contacting the outside surface of the blade case 113, as shown in FIGS. 1 and 4, the entire outside surface of the blade case 113 including the gear housing 114, i.e. the side wall surface on the side of the motor housing 111, the side wall surface on the side of the dust case 107 and the peripheral wall surface connecting the both side wall surfaces, is covered with a blade case cover 119 formed of heat-resistant material, such as synthetic resin or synthetic rubber. In this case, an appropriate clearance is provided between the blade case 113 and the blade case cover 119 so that a double wall having so-called air space is formed. The blade case cover 119 is removably connected to the blade case 113 by fastening means such as screws.

As shown in FIGS. 1 and 4, the dust case 107 is disposed on the opposite side of the motor housing 111 with respect to the blade case 113. The dust case 107 is removably attached by a fastening device (not shown) to the side wall surface of the blade case 113 which faces the dust case 107. The dust case 107 has a dust collecting inlet (not shown) formed in a position to face the chip outlet 113b of the blade case 113. Hot chips flow into a dust collecting chamber 107a via the dust collecting inlet. The dust case 107 is formed of metal such as aluminum alloy in consideration of heat resistance against the hot meal chips. The dust case 107 may be heated by the collected chips and its outside surface may become hot. In view of this fact, in order to prevent the user from directly contacting the outside surface of the dust case 107, the entire outside surface is covered with a dust case cover 141 formed of heat-resistant material such as synthetic resin or synthetic rubber.

The dust case cover 141 is arranged at a predetermined distance from the outside surface of the dust case 107, so that air space 143 is formed between the dust case 107 and the dust case cover 141. The dust case cover 141 has a bowl-like shape similar to the contours of the dust case 107. The dust case cover 141 is removably connected to the dust case 107 by fastening device such as screws, with the open peripheral edge portion of the dust case cover 141 in contact with the outside surface of the dust case 107 or the blade case cover 119.

When the driving motor 121 is driven, the cooling fan 131 on the driving shaft 123 of the driving motor 121 draws outside air into the motor housing 111 through an air intake (not shown) formed in a portion (the axial end) of the motor housing 111. The intake air flows within the motor housing 111, thereby cooling the driving motor 121. Thereafter, the air flows out into the gear housing 114 through the cooling fan 131. As shown in FIGS. 1 and 2, a generally annular cooling air outflow passage 145 is formed in the side surface of the gear housing 114 which faces the cooling fan 131. The cooling air outflow passage 145 is defined by denting the side surface of the gear housing 114 inward (leftward as viewed in the drawings) and receives the cooling air which flows out of the motor housing 111 in the axial direction of the cooling fan 131.

As shown by thick arrows in FIG. 2, the cooling air flows out into the cooling air outflow passage 145 and then into a cooling air outflow space 147 above the outer peripheral portion of the gear housing 114. Then, the cooling air branches out into three flows in the cooling air outflow space 147. The cooling air outflow space 147 is defined between the blade case 113 and the blade case cover 119 by denting a portion of the side surface of the blade case 113 on the side of the motor housing 111 inward of the blade case 113.

One of the three flows of the cooling air forms a first flow that is led into the air space 143 via a plurality of slit-like communication apertures 149 in the side wall surface of the blade case 113. A first passage of the first flow is defined by the communication apertures 149. The communication apertures 149 are formed near the upper portion of the side wall surface of the blade case 113 to allow communication between the cooling air outflow space 147 and the air space 143. The cooling air is introduced into the air space 143 through the communication apertures 149 and serves to cool the outside surface of the dust case 107. Thereafter, the cooling air is discharged obliquely downward to the outside through a plurality of slit-like exhaust apertures 151. The exhaust apertures 151 are formed in the lower forward end portion of the dust case cover 141.

Another flow of the cooling air forms a second flow that serves to cool the outside surface of the blade case 113. A second passage of the second flow is defined by a clearance 155, a cooling air guide passage 153 and a spout 157. The clearance 155 is defined between the blade case 113 and the blade case cover 119. The cooling air is led from the cooling air outflow space 147 to the clearance 155 via the cooling air guide passage 153. The cooling air serves to cool the blade case 113 by flowing through the clearance 155. The cooling air is then discharged to the outside through the spout 157. The cooling air guide passage 153 is defined by denting a portion of the side surface of the blade case 113 on the side of the motor housing 111 inward of the blade case 113. Further, the spout 157 is formed in the lower forward end of the blade case cover 119 such that the cooling air is blown on the upper surface of the base 105, or more specifically, toward a blade position check notch 161 as shown in FIG. 1.

The notch 161 is formed in the forward end portion of the base 105 and indicates a cutting line along which cutting is performed by the blade 129. The cooling air guide passage 153, the clearance 155 and the spout 157 correspond to the "exhaust passage" according to the invention. Further, the notch 161 corresponds to the "mark" according to the invention. The cooling air outflow space 147, the cooling air guide passage 153 and the clearance 155 are defined by the blade case 113 and the blade case cover 119 and form air space between the blade case 113 and the blade case cover 119.

The other flow of the cooling air forms a third flow that is introduced into the blade case 113. The third flow serves to reduce the tendency that the chips fly from the blade case 113 to the gear housing 114. In other words, it serves to assist the chips in moving toward the chip outlet 113b. A third passage of the third flow is defined by a guide hole 159. The guide hole 159 is formed in the forward portion of the wall surface that defines the cooling air outflow space 147. The guide hole 159 is formed above the center of rotation of the blade 129 and opens in the direction that allows the cooling air to be discharged generally horizontally in the forward direction. Specifically, the guide hole 159 opens in such a direction that the direction of discharge of the cooling air into the blade case 113 crosses the direction in which the chips fly out into the blade case 113 by the operation of cutting the workpiece and coincides with the direction in which the cooling air guides the chips toward the inner circumferential surface 113a of the blade case 113. The guide hole 159 is a feature that corresponds to the "cooling air guide" according to the invention.

Operation of the dust collecting circular saw 101 is now explained. The base 105 is placed on a workpiece to be cut and the trigger 117a is operated by the user to drive the driving motor 121. Thus, the blade 129 is rotated via the driving shaft 123 and the spindle 125. In this state, the circular saw 101 is slid forward on the workpiece, so that the workpiece is cut by the blade 129.

When the driving motor 121 is driven, the cooling fan 131 rotates together with the driving shaft 123 and draws the cooling air into the motor housing 111. Then, as shown by the thick arrows in FIG. 1, the cooling air flows axially within the motor housing 111, thereby cooling the driving motor 121. Thereafter, the cooling air flows out into the cooling air outflow passage 145 of the gear housing 114 and then into the cooling air outflow space 147. Part of the cooling air which has flown into the cooling air outflow space 147 is led into the air space 143 of the dust case 107 through the communication apertures 149 as shown by the thick arrow in FIG. 2. Then, the cooling air cools the outside surface of the dust case 107 by flowing through the air space 143 as shown by the thick arrows in FIGS. 1 and 4. Thereafter, the cooling air is discharged to the outside through the exhaust apertures 151.

The outside surface of the dust case 107 is covered with the dust case cover 141, and the air space 143 is provided between the dust case 107 and the dust case cover 141. Therefore, the air space 143 serves to prevent heat transfer from the dust case 107 to the dust case cover 141. Moreover, heat dissipated from the outside surface of the dust case 107 is actively released to the outside by means of the cooling air flowing through the air space 143, so that the outside surface of the dust case 107 can be cooled. Further, with the construction in which the dust case cover 141 covers almost the entire outside surface of the dust case 107, user may directly contact the outside surface of the dust case 107 during cutting operation.

Further, another part of the cooling air which has flown into the cooling air outflow space 147 is led through the cooling air guide passage 153 into the clearance 155 formed between the blade case 113 and the blade case cover 119 as shown by the thick arrows in FIG. 2. Then, the cooling air cools the outside surface of the blade case 113 by flowing through the clearance 155. Thereafter, as shown in FIG. 1, the cooling air is discharged onto the upper surface of the base 105 toward the notch 161 through the spout 157. At this time, the cooling air blows away chips around the notch 161 on the base 105, so that the user can readily check the position of the blade 129.

Further, the other part of the cooling air which has flown into the cooling air outflow space 147 is introduced into the blade case 113 via the guide hole 159. Then, as shown by the thick arrow in FIG. 3, the cooling air is discharged generally horizontally in the forward direction from above the center of rotation of the blade 129. This flow serves to reduce the tendency that the chips generated by the cutting operation of the blade 129 fly toward the gear housing 114. Specifically, the flow acts upon the chips (shown by the thin arrows) that fly out into the blade case 113 during the cutting operation, such that the chips are guided toward the inner circumferential surface 113a of the blade case 113. Thus, the chips flow upward toward the chip outlet 113b along the inner circumferential surface 113a of the blade case 113. Then, the chips are discharged from the chip outlet 113b into the dust case 107. As a result, chip collection efficiency is enhanced. Further, by reducing the tendency that the chips fly toward the gear housing 114 or toward the center of the blade case 113, chips can be effectively kept out of the rotation sliding portion 115a of the safety cover 115 disposed within the blade case 113. Thus, chips can be effectively prevented from being caught in the rotation sliding portion 115a.

Further, the invention can be applied to a dust collecting circular saw not only for metal cutting but also for wood or stone cutting. Besides the above described embodiment, the air space 143 may be divided by a partition such that a passage, e.g. a meander passage (winding passage) like a winding maze, is formed within the air space 143. In this case, the cooling air led into the air space 143 via the communication apertures 149 flows through the meander passage and is discharged to the outside from the exhaust apertures 151. With this construction, residence time of the cooling air within the air space 143 can be elongated, so that the effectiveness of cooling the dust case 107 can be enhanced. Further, beside the representative embodiment, the air space 143 may be formed in layers on the outside surface of the dust case 107. Further, the dust case cover 141 may cover only part of the outside surface of the dust case 113.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Description of Numerals 101 dust collecting circular saw
103 circular saw body
105 base
107 dust case
107a dust collecting chamber
111 motor housing
113 blade case
113a inner circumferential surface
113b chip outlet
114 gear housing
115 safety cover
115a rotation sliding portion
117 handgrip
117a trigger
119 blade case cover
121 driving motor
123 driving shaft
123a driving gear
125 spindle
129 blade
131 cooling fan
141 dust case cover
143 air space
145 cooling air outflow passage
147 cooling air outflow space
149 communication aperture (cooling air guide)
151 exhaust aperture
153 cooling air guide passage (exhaust passage)
155 clearance (exhaust passage)
157 spout (exhaust passage)
159 guide hole (cooling air guide)
161 notch (mark)

What we claim is:

1. A circular saw, comprising:
   a blade that cuts a workpiece,
   a blade case that covers the blade,
   a motor that drives the blade,
   a cooling fan that generates a cooling air to cool the motor,
   a dust case provided adjacent to the blade case, the dust case having an outer surface and an inner surface that define a dust collecting chamber that collects chips generated during a cutting operation by the blade,
   a dust case cover that covers at least part of the outer surface of the dust case, and
   an air space substantially free of chips generated during the cutting operation, separate and distinct from the dust collecting chamber and the blade case, formed between the dust case cover and the outer surface of the dust case,
   wherein the cooling air generated by the cooling fan is directly introduced into the air space so as to form a cooling air flowpath separate from a dust flowpath,
   wherein the air space and the dust case are provided on a first side of the blade, and
   wherein the cooling fan and the motor are provided on a second side of the blade opposite the first side.

2. The circular saw as defined in claim 1, wherein the dust case cover is provided substantially on the entire outside surface of the dust case.

3. The circular saw as defined in claim 1, further comprising a blade case cover that covers an outside surface of the blade case, an exhaust passage formed between the blade case and the blade case cover, a base connected to the blade case and a blade position check mark provided on the base to perform the cutting operation by the blade, wherein the cooling air to cool the motor is introduced into the exhaust passage and led through the exhaust passage along the outside surface of the blade case and then blown out toward the blade position check mark on the upper surface of the base.

4. The circular saw as defined in claim 1, further comprising a cooling air guide that guides the cooling air to cool the motor into the blade case, wherein the cooling air introduced into the blade case by the cooling air guide introduces the chips within the blade case into the dust case.

5. The circular saw as defined in claim 1, wherein the blade is arranged to cut a metal workpiece, hot metal chips generated during the workpiece cutting operation is collected within the dust case, and the air space prevents heat propagation of the hot chips from the dust case to the dust case cover.

6. The circular saw as defined in claim 1, wherein the blade is arranged to cut a metal workpiece, hot metal chips generated during the workpiece cutting operation is collected within the dust case, and the air space prevents heat propagation of the hot chips from the dust case to the dust case cover, the circular saw further comprising, a cooling air guide that guides the cooling air to cool the motor into the blade case, wherein the direction of guiding the cooling air into the blade case crosses the direction in which the chips fly out into the blade case by the operation of cutting the workpiece and coincides with the direction in which the cooling air guides the chips toward the inner circumferential surface of the blade case.

7. The circular saw as defined in claim 1, wherein the air space comprises a winding passage to meander the cooling air within the air space.

8. The circular saw as defined in claim 1, wherein air space comprises a plurality of air layers from the dust case to the dust case cover.

9. The circular saw as defined in claim 1, wherein the air space communicates with the cooling fan such that the cooling air generated by the cooling fan is directly communicated to the air space while bypassing the dust collecting chamber.

* * * * *